United States Patent

[11] 3,621,952

[72] Inventors Paul J. Long, Jr.
Dayton;
Joseph P. Pendergast, Bellbrook, both of Ohio
[21] Appl. No. 874,327
[22] Filed Nov. 5, 1969
[45] Patented Nov. 23, 1971
[73] Assignee General Motors Corporation
Detroit, Mich.

[54] SPRING LOADED PISTON ROD SEAL
1 Claim, 5 Drawing Figs.

[52] U.S. Cl. ................................................. 188/322,
277/153, 277/178, 277/209
[51] Int. Cl. ....................................................... F16f 9/36
[50] Field of Search ........................................... 188/100 S,
322 S, 315; 277/153, 178, 208, 209, 211

[56] References Cited
UNITED STATES PATENTS
2,793,889  5/1957  Potter, Jr. .................... 188/100 S
2,808,277  10/1957  Binder .......................... 277/153 X
2,906,377  9/1959  Peras ............................ 188/100 S UX
2,992,027  7/1961  Wright et al. .................. 277/153 X FOREIGN PATENTS
605,382  5/1960  Italy ............................. 188/100 S Primary Examiner—George E. A. Halvosa
Attorneys—William S. Pettigrew and John C. Evans ABSTRACT: In preferred form, a hydraulic shock absorber piston rod seal of resilient material having an annular collar portion supporting the seal and having radially inwardly projecting end portions on opposite sides of the collar portion which contact the piston rod. One end portion extends axially outward from the shock absorber to prevent the entry of dirt between the piston rod and the seal. The second end portion has a V-shaped cross section adapted to contact the piston rod at a pointed edge to prevent the escape of hydraulic fluid between the piston rod and the seal. An annular garter spring encircles the second end portion to bias the pointed edge of the V-shaped second end portion against the piston rod.

PATENTED NOV 23 1971 3,621,952

INVENTORS
Paul J. Long, Jr. &
BY Joseph P. Pendergast

J.C. Evans
ATTORNEY

INVENTORS
Paul J. Long, Jr. &
BY Joseph P. Pendergast
J. C. Evans
ATTORNEY

SPRING LOADED PISTON ROD SEAL

This invention relates to hydraulic shock absorbers and more particularly to shock absorber piston rod seals.

In automobile suspension systems, it is desirable to utilize a hydraulic shock absorber which uniformly dampens vibrations and road shocks. Variance in the shock's dampening characteristics caused by hydraulic fluid temperature changes or by wearing of shock components should be minimized.

An increase in hydraulic fluid temperature is known to increase the frictional force between the piston rod and the seal. Piston rod seal wear obviously decreases this frictional effect. These factors which cause changes in friction between the seal and the piston rod may significantly alter the shock's dampening characteristics. By minimizing friction between the seal and the piston rod, this effect of temperature change and wear on the shock's dampening characteristics is reduced.

Prior piston rod seals contact the piston rod over a considerable area and the frictional force therebetween is substantial. The present piston rod seal contacts the piston rod over a relatively small area and resultantly the frictional force therebetween is greatly reduced. Also because the contact area of the seal is small, less external constrictive force on the seal than normally is applied will achieve desirable sealing of fluid in the shock absorber. The lighter constrictive force on the seal extends seal life by reducing wear.

Therefore, an object of the inventor in the present application is to provide an improved low-friction piston rod seal to contact the piston rod in a hydraulic shock absorber.

A further object of the inventor in the present application is the provision of a low-friction piston rod seal in a hydraulic shock absorber having an inwardly pointed V-shaped lip portion whose narrow edge contacts the piston rod to seal hydraulic fluid in the shock absorber and to reduce friction between the seal and the piston rod.

Further objects and advantages of the present invention will be apparent from the following description, reference being had to the accompanying drawings wherein a preferred embodiment of the present invention is clearly shown.

Figure 1:
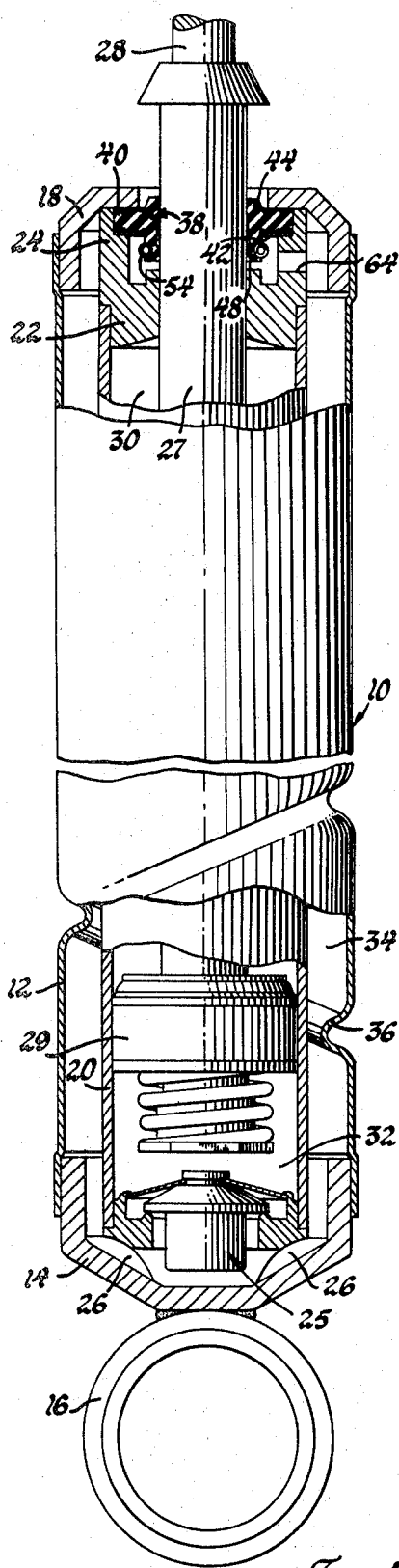
FIG. 1 is a vertical view of the shock absorber partially sectioned to reveal interior portions.

In FIG. 1 of the drawings, a shock absorber assembly 10 is illustrated. Assembly 10 includes an outer reservoir tube 12 which is attached at its lower end in a fluid-type manner to a circular cup-shaped bottom end cap 14. A fitting 16 attached to the end cap 14 is adapted to secure the shock absorber assembly 10 to the unsprung mass of the vehicle.

The upper end of the reservoir tube 12 is enclosed by an end cap 18 which is connected by a fluid-type connection to the reservoir tube 12. Positioned concentrically within the reservoir tube 12 is a smaller diameter pressure cylinder tube 20. A piston rod guide 22 is supported within the upper end of pressure cylinder tube 20 and has an upwardly extending annular side 24 which contacts the surrounding top end cap 18 to coaxially position the pressure cylinder tube 20 relative to reservoir tube 12. Rod guide 22 is axially retained within the top end of tube 20 by the end cap 18.

The lower portion of pressure cylinder tube 20 is coaxially positioned relative to reservoir tube 12 by a base valve assembly 25 which is held within the lower end of the pressure cylinder tube 20 by tabs 26 on the lower end cap 14. The design of the base valve forms no part of the present invention and may be of the type disclosed in U.S. Pat. No. 2,583,169 issued Jan. 22, 1952 to Funkhouser.

Concentrically located within pressure cylinder tube 20 and extending through axial bores within rod guide 22 and end cap 18 is a piston rod 27. The upper end of the piston rod 27 extends through end cap 18 and is secured to a fitting 28 exteriorly of the shock absorber 10. Fitting 28 is adapted to secure the shock absorber to the sprung mass of a vehicle. The valved piston 29 is attached to the lower end of piston rod 27 and is supported within pressure cylinder tube 20 for reciprocal movement therein. The design of the valved piston 29 is conventional and forms no part of the present invention. It may be of the type disclosed in U.S. Pat. No. 2,695,034 issued Nov. 23, 1954 to Brundrett et al. Relative movement between the sprung mass and the unsprung mass of the vehicle causes the piston rod 27 and the attached piston 29 to reciprocate within the pressure cylinder tube 20.

A variable volume rebound chamber 30 is formed within the upper portion of pressure cylinder tube 20 between rod guide 22 and valved piston 29. A variable volume compression chamber 32 is formed within pressure cylinder tube 20 between the valved piston 29 and the base valve assembly 25. Both chambers 30 and 32 are completely filled with hydraulic fluid during normal operation of the shock absorber. Movement of the valved piston 29 within pressure cylinder tube 20 towards the rod guide 22 necessarily decreases the volume of the rebound chamber 30. Likewise, movement of the valved piston 29 within pressure cylinder tube 20 toward base valve assembly 25 decreases the volume of compression chamber 32. Valve elements within piston 29 regulate the flow of hydraulic fluid between chambers 30 and 32 caused by the reciprocation of the piston 29. The regulation of hydraulic fluid flow through piston 29 produces a predetermined dampening of relative movement between sprung and unsprung masses of the associated vehicle.

The movement of piston rod 27 downward within the pressure cylinder tube 20 during a compression stroke causes a decrease in compression chamber volume greater than the increase in the rebound chamber volume. Likewise, reverse piston rod movement upward within pressure cylinder tube 20 during a rebound stroke causes an increase in compression chamber volume greater than the decrease in rebound chamber volume. The differential volume in either situation equals the volume of the piston rod 27 entering and exiting the rebound chamber 30. Because of this volumetric experience, a supplementary quantity of hydraulic fluid must be supplied to the compression chamber 32 upon movement of the piston 29 upward in pressure cylinder tube 20 and excess fluid must be removed from compression chamber 32 upon movement of the piston 29 downward in pressure cylinder tube 20. A hydraulic fluid reservoir chamber 34 located in annular space between the reservoir tube 12 and a pressure cylinder tube 20 supplies fluid during the rebound stroke and receives fluid during the compression stroke.

The base valve assembly 25 is located between reservoir chamber 34 and compression chamber 32 to regulate the flow of hydraulic fluid therebetween. Valving components within base valve assembly 25 permit hydraulic fluid from the reservoir chamber 34 to enter the compression chamber 32 upon movement of the piston 29 away from the valve 25. Other valving components within base valve assembly permit hydraulic fluid from the compression chamber 32 to flow into the reservoir chamber 34 upon movement of the piston 29 downward in pressure cylinder tube 20.

It is apparent that the volume of fluid within reservoir chamber 34 varies considerably during reciprocation of piston 29 within the pressure cylinder tube 20. To accommodate this change of fluid volume within the reservoir chamber it is common to provide an air space within the reservoir chamber 34 above the fluid level. However, the pulsating flow of hydraulic fluid in the reservoir chamber 34 causes the fluid to become undesirably aerated. To reduce aeration, an indented spiral groove 36 is formed in the reservoir tube 12. Groove 36 reduces pulsation of hydraulic fluid in the reservoir chamber 34.

Figure 2:
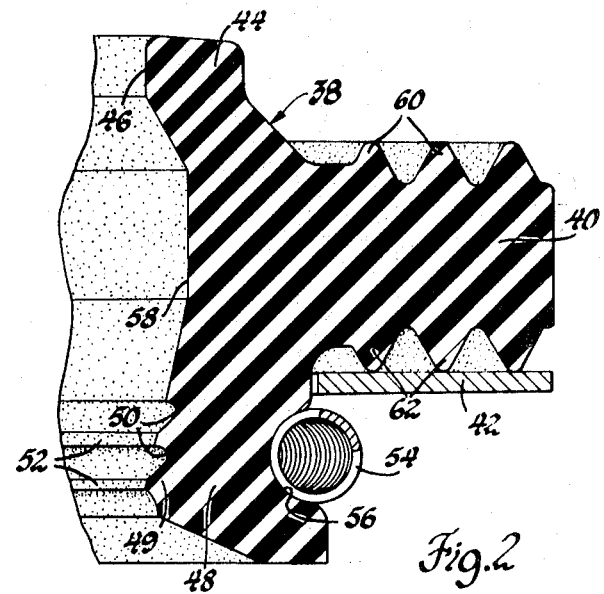
FIG. 2 is a fragmentary enlarged sectional view of one embodiment of the piston rod seal shown in FIG. 1.
Figure 3:
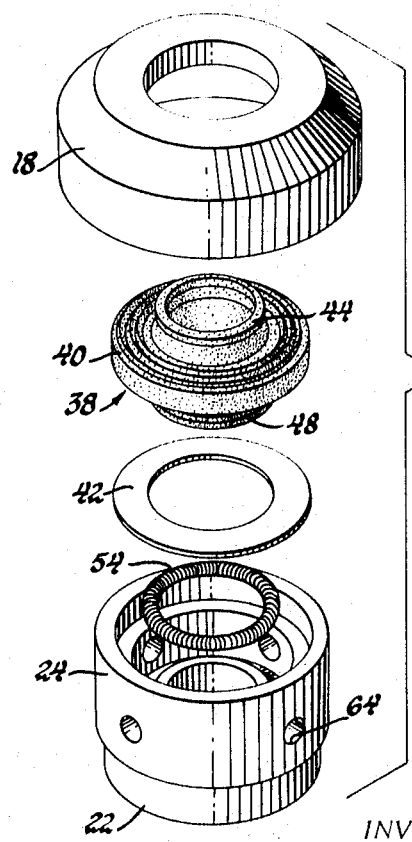
FIG. 3 is an exploded view of shock absorber components associated with piston rod sealing.
Figure 4:
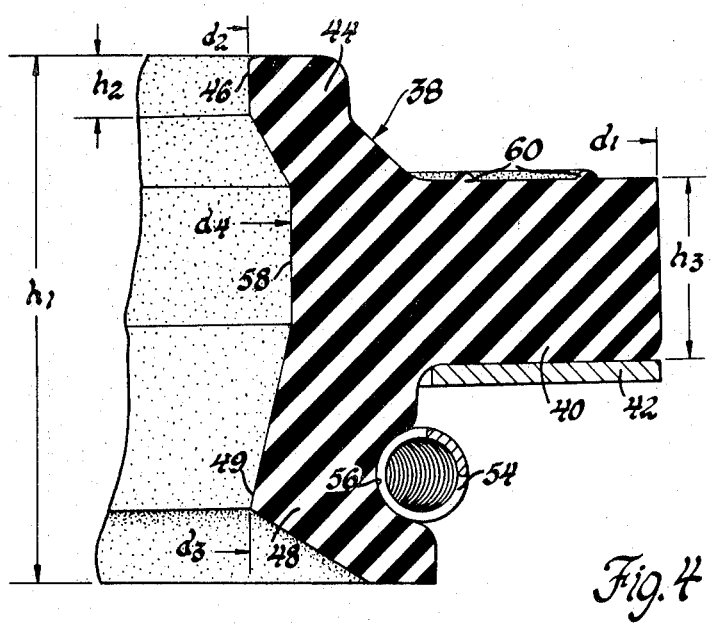
FIG. 4 is a fragmentary enlarged sectional view of another embodiment of the piston rod seal shown in FIG. 1.

An annular piston rod seal 38 encircles piston rod 27 to prevent leakage of hydraulic fluid from the shock absorber interior when the piston rod reciprocates within the pressure cylinder tube 20. As illustrated in FIGS. 2 and 4, seal 38 includes a radially outwardly directed annular collar portion 40. The collar portion 40 is compressed between side 24 of rod guide 22 and the end cap 18 to support the seal 38. An external stiffening washer 42 between collar portion 40 and the rod guide 22 contributes to seal support and reduces axial movement of the seal 38 with respect to piston rod 27.

An optional method of biasing collar portion 40 against end cap 18 would be the elimination of the step in side 24 of guide 22 and the placement of a helical compression spring between guide 22 and portion 40. This method would allow greater variance in the distance between end cap 18 and guide 22 and in the thickness of collar portion 40.

The annular seal 38 with collar portion 40 is molded of resilient material such as rubber and has a radially inwardly tapered end portion 44 which extends axially outward from the collar portion 40. End portion 44 forms an annular surface 46 adapted to contact the piston rod 27 to scrape dirt from piston rod 27 and to prevent it from passing between the seal 38 and the piston rod 27.

On the opposite side of seal 38, a radially inwardly projecting lip portion 48 extends axially away from the collar portion 40. Lip portion 48 has a generally V-shaped cross section as shown in FIGS. 2 and 4 with a pointed edge 49 adapted to contact piston rod 27 to prevent the leakage of hydraulic fluid between seal 38 and piston rod 27. A plurality of alternate grooves 50 and sealing surfaces 52 may be molded on the lip portion 48 as shown in FIG. 2. An annular garter spring 54 is supported in a groove 56 in the outer surface of lip portion 48. Spring 54 biases sealing surfaces 52 against the piston rod 27 to prevent hydraulic fluid leakage therebetween.

The garter spring 54, in addition to biasing the seal against the rod, retains washer 42 in place against the collar 40. The convenience of assembling a one piece multipart seal assembly as compared to assembling multiple parts singularly saves costly man hours on the assembly line.

A recess 58 in the seal 38 is adapted to prevent contact between the piston rod 27 and the seal 38 except at surface 46 and surfaces 52. The reduced contact area between the seal 38 and piston rod 27 decreases friction between the seal and the piston rod and contributes to relative reciprocation between the piston rod 27 and the seal 38.

Leakage of hydraulic fluid around the outside of collar portion 40 is prohibited by forming a plurality of concentric ridges 60 and 62 on the upper and lower side surfaces of collar portion 40 as shown in FIG. 2. Ridges 60 are formed only on the upper surface of the seal in FIG. 4. When the collar portion 40 is compressed between end cap 18 and side 24 of rod guide 22, ridges 60 and 62 are flattened to form a plurality of contact areas under relatively high pressure.

Hydraulic fluid which passes between rod guide 22 and piston rod 27 into the vicinity of seal 38 is returned to reservoir chamber 34 through a plurality of bleed holes 64 in side 24 of rod guide 22 as seen in FIG. 1.

A working embodiment of the piston rod seal shown in FIG. 4 has been tested in a one inch diameter shock absorber. The one inch diameter shock absorber has a piston rod diameter between .4887 and .4892 inches and has a highly polished finish. The seal itself is molded of buna-n rubber. Referring to FIG. 4, the outer diameter $d_1$ of the collar portion 40 is shown in the following table. The labels $d_2, d_3$ and $d_4$ denote the diameters of portion 44, lip portion 48 and the recess 58 respectively. The height of the seal $h_1$ is also listed with the height $h_2$ of surface 46 and the height $h_3$ of collar portion 40 are shown.

| Symbol (inches) | |
|---|---|
| $d_1$ | 1.000 |
| $d_2$ | 0.475 |
| $d_3$ | 0.455 |
| $d_4$ | 0.525 |
| $h_1$ | 0.375 |
| $h_2$ | 0.050 |
| $h_3$ | 0.128 |

Figure 5:
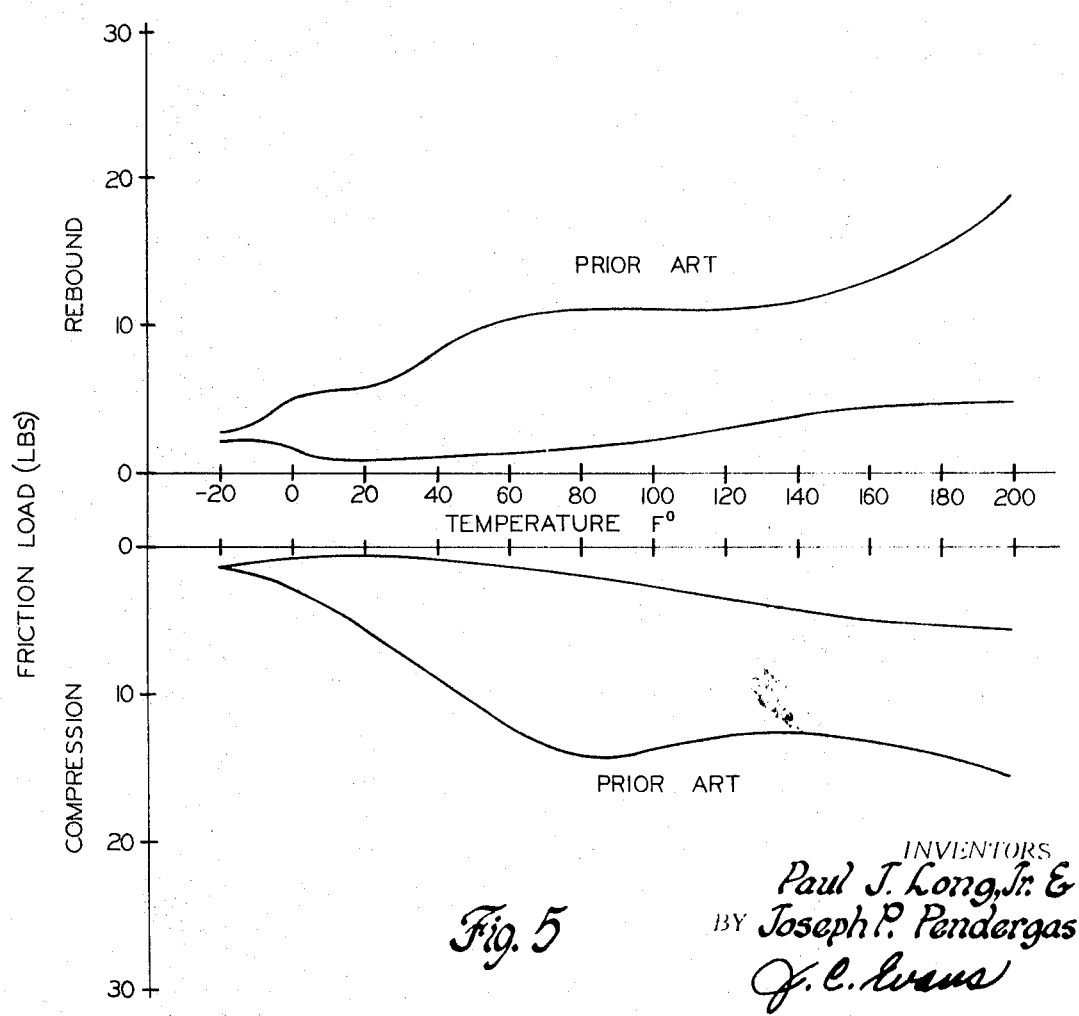
FIG. 5 is a graph of friction load vs. hydraulic fluid temperature for the seal shown in FIG. 4.

While an automobile shock absorber is reciprocated to dampen vibration, fluid pressures from zero to 2,500 p.s.i. are encountered in the rebound chamber 30. A pressure drop across rod guide 22 normally reduces the pressure level adjacent seal 38 to a maximum of 125 p.s.i. Satisfactory sealing capacity has been exhibited by the seal 38 when compared with prior high-friction piston rod seals. The prior piston rod seals produced a maximum frictional force of 20 pounds force as shown in FIG. 5. The present low-friction piston rod seal exhibits a maximum frictional force on only 6 pounds.

While the embodiments of the present invention as herein described constitute preferred forms, it is to be understood that other forms might be adopted.

I claim:

1. A direct acting hydraulic shock absorber comprising: a pressure cylinder tube; valved piston means concentrically supported within said pressure cylinder tube for the regulation of hydraulic fluid flow therethrough; a reservoir tube concentrically surrounding said pressure cylinder tube and forming a hydraulic fluid reservoir chamber therebetween; a piston rod attached to said piston means for reciprocation in said pressure cylinder tube; said piston rod extending axially outward from said pressure cylinder tube; a piston rod guide within one end of said pressure cylinder tube and around said piston rod for positioning said piston rod concentrically within said pressure cylinder tube; a cup-shaped end member connected at its periphery to said reservoir tube and having a central bore through which said piston rod extends; an annular piston rod seal assembly encircling said piston rod to prevent leakage of hydraulic fluid therebetween; said piston rod seal assembly having a radially outwardly extending collar portion supported between said piston rod guide and said end member; a radially inwardly tapered end portion on one side of said collar portion which extends axially outward from said shock absorber to contact said piston rod for blocking the entry of foreign material between said seal and said piston rod; a radially inwardly projecting lip portion on a second side of said collar portion extending axially inward with respect to said shock absorber; a rigid washer with a central bore encircling said lip portion and adjacent said second side of said collar portion; a coil spring around the outer periphery of said lip portion with its ends joined to form an annular compression means to bias said lip portion against said piston rod; said annular coil spring having a greater diameter than said central bore of said washer and thus being spaced radially outwardly from said inner periphery of said washer which prevents axial movement of said lip portion outward from said shock absorber and retains said washer around said lip portion during assembly of said shock absorber.

* * * * *